United States Patent [19]

Pierce

[11] Patent Number: 5,328,352
[45] Date of Patent: Jul. 12, 1994

[54] SPRUE AND VALVE ASSEMBLY FOR DELIVERING A CURABLE LIQUID MATERIAL TO A MOLD CAVITY

[76] Inventor: William D. Pierce, 1635 S. Coats, Oxford, Mich. 48671

[21] Appl. No.: 845,167

[22] Filed: Mar. 3, 1992

[51] Int. Cl.⁵ .............................................. B29C 45/23
[52] U.S. Cl. ................................... 425/562; 425/567; 425/569; 425/DIG. 47; 425/DIG. 51
[58] Field of Search ............... 425/562, 564, 567, 568, 425/569, 556, DIG. 47, DIG. 51, 558

[56] References Cited

U.S. PATENT DOCUMENTS

| | | | |
|---|---|---|---|
| 2,436,122 | 2/1948 | Rotsler | 425/564 |
| 2,923,031 | 2/1960 | Collion | 425/227 |
| 2,988,779 | 6/1961 | Barton et al. | 425/563 |
| 2,992,455 | 7/1961 | Salzman | 425/562 |
| 3,462,333 | 8/1969 | McCormick et al. | 425/DIG. 47 |
| 3,787,159 | 1/1974 | Bielfeldt | 425/562 |
| 4,108,956 | 8/1978 | Lee | 264/161 |
| 4,231,987 | 11/1980 | Osawa et al. | 425/556 |
| 4,498,860 | 2/1985 | Gahan | 425/DIG. 51 |
| 4,592,721 | 6/1986 | Charlebois et al. | 425/558 |
| 4,828,480 | 5/1989 | Smith | 425/562 |
| 5,028,377 | 7/1991 | Hendry | 264/161 |

Primary Examiner—Tim Heitbrink
Attorney, Agent, or Firm—Reising, Ethington, Barnard, Perry & Milton

[57] ABSTRACT

A sprue and valve assembly (22) delivers a curable liquid material to a mold cavity (26) and thereafter is easily cleaned of the cured residual core (52) remaining from the liquid material. A sprue (34) having a flow passage (36) extends between the exterior surface of a mold (24) and a runner (30) in the mold (24). A valve body (54) is connected to the exterior face of the sprue (34). A coin slide type closure element (56) within the valve body (54) is controlled by a lever mechanism to selectively open or close the flow passage (36) to the curable liquid material flow. The flow passage (36) is tapered to permit easy removal of the cured residual core (52). PTFE seals (74) are disposed on opposite sides of the closure element (56). A bayonet fitting permits quick connection and disconnection of a supply line (18) to the valve body (54). An ejector assembly (80) connects to the bayonet fitting and includes an ejector shaft (84) which is manually struck to eject the cured residual core (52) held fast within the flow passage (36).

14 Claims, 5 Drawing Sheets

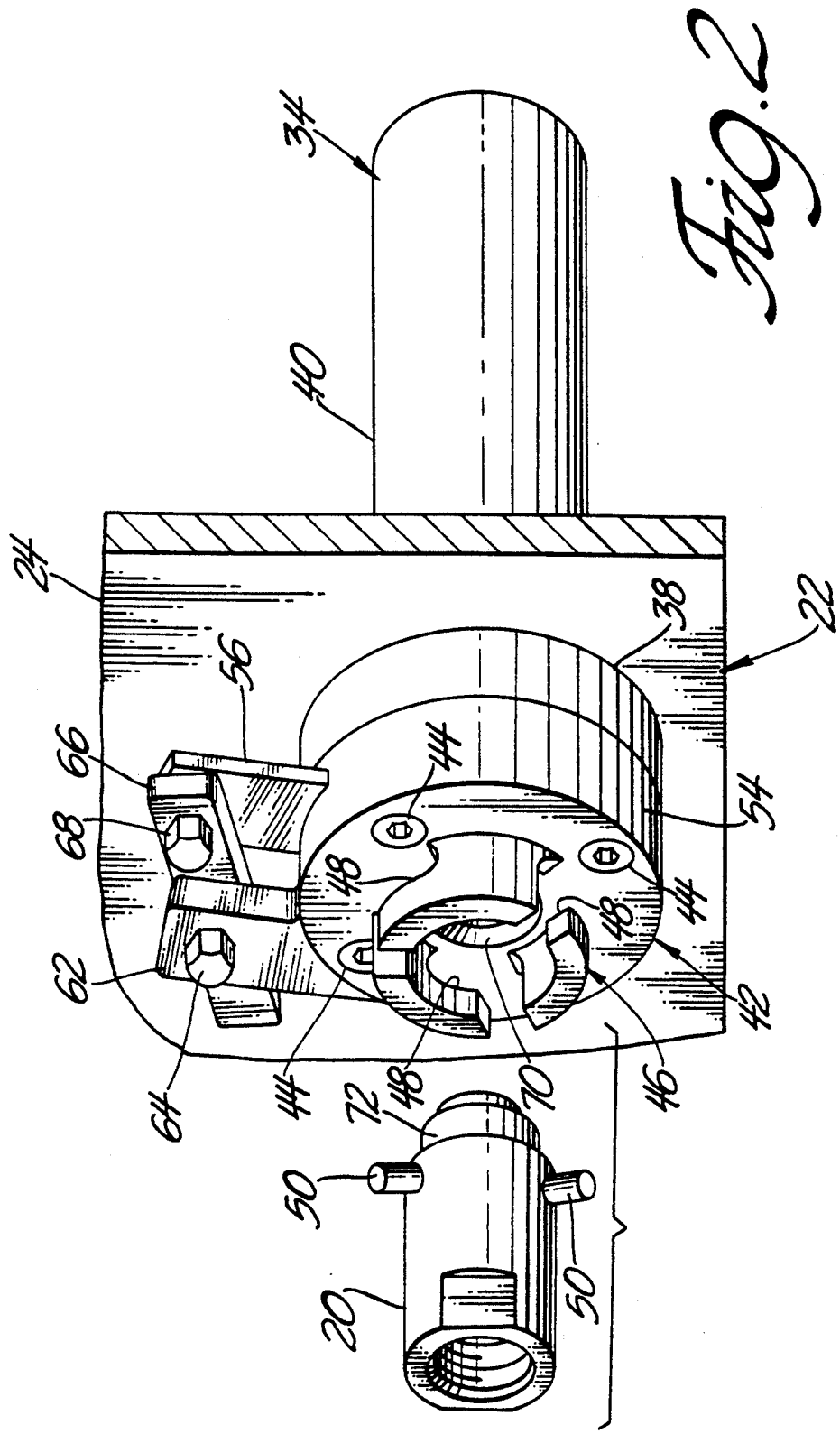

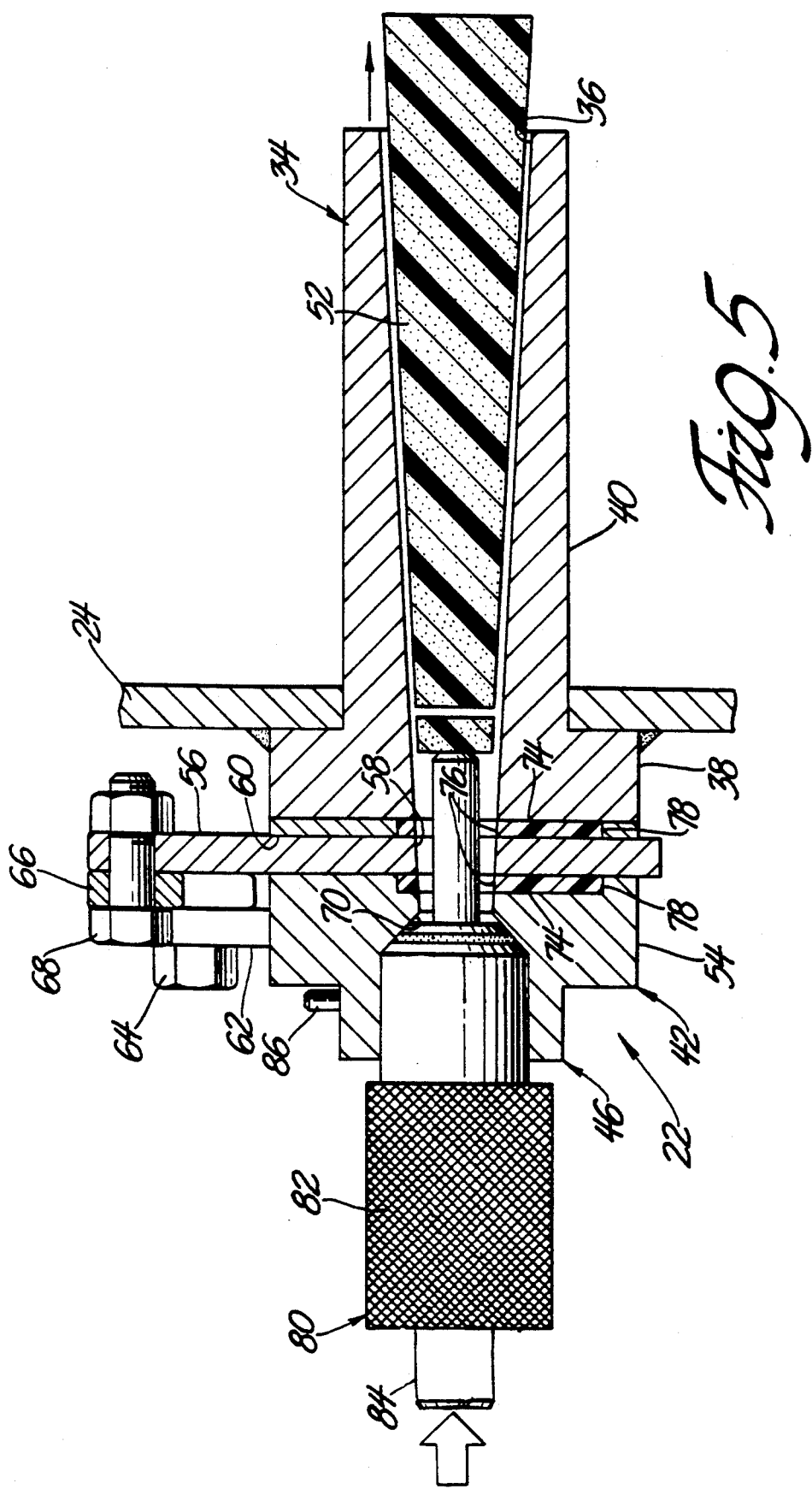

SPRUE AND VALVE ASSEMBLY FOR DELIVERING A CURABLE LIQUID MATERIAL TO A MOLD CAVITY

TECHNICAL FIELD

The subject invention relates to a resin transfer molding shut off valve which can be quickly unclogged of the cured residual core after each use. More particularly, the subject invention comprises such a valve having a tapered flow passage enlarging in the downstream direction of fluid flow.

BACKGROUND ART

Resin transfer molding (RTM) is a well known method of producing large composite structures, such as vehicular bumpers and the like. According to present RTM technology, two liquid components, a resin and a hardener, are mixed together and immediately transfer through a supply line to a shut off valve located immediately upstream of a sprue leading into the mold and ultimately to a mold cavity. Once the mold cavity has been filled, the valve is closed and the supply line detached from the valve. The entire mold, sprue and valve assembly is then heated to a curing temperature so that the mixed resin solidifies around the reinforcing matrix to form a rigid and durable product. The mold is then opened and the product removed from the mold cavity. However, before the mold can be cycled again, the cured resin must be removed from the sprue and valve assembly.

Because the resin material, once cured, is extremely hard and adheres steadfastly to all contacting surfaces, the sprue and valve assembly frequently becomes clogged with a cured residual core of resin. Because the prior art has not found a more efficient method of removing the cured residual core from the flow passage in the sprue and valve assembly, the prevalent technique for cleaning the sprue and valve assembly is to drill out the cured residual core. Thus, according to the most advanced prior art techniques, the sprue and valve assembly must be cleaned of the cured residual core between each cycle of the mold by drilling out the cured residual core.

SUMMARY OF THE INVENTION AND ADVANTAGES

The subject invention comprises a sprue and valve assembly for delivering a curable liquid material to a mold cavity and thereafter easily cleaned of the cured residual core remaining from the liquid material. The assembly comprises a sprue means defining an elongated flow passage for transferring a curable liquid material in a downstream direction toward a mold cavity, a connector means for releasibly connecting a supply line of the liquid material to the sprue material at an upstream location, a valve means for selectively preventing flow of the liquid material through the flow passage of the sprue means, and characterized by the flow passage having a taper enlarging in the downstream direction for effecting convenient removal of the cured residual core.

The subject invention overcomes the disadvantages of the prior art by the provision of a flow passage through the sprue means having a taper enlarging in the downstream direction. The tapering flow passage allows the cured residual core to be easily removed from the sprue means without requiring the laborious and cumbersome prior art technique of drilling out the cured residual core. Instead, the tapered flow passage most frequently permits the cured residual core to be removed automatically from the sprue means as the curable liquid material solidifies. This is because the curable liquid material normally shrinks as it solidifies thereby automatically drawing or pulling the cured residual core from the tapering flow passage. However, under circumstances where the cured residual core adheres steadfastly to the flow passage, the cured residual core can be easily removed by simply forcibly striking the cured residual core in an axial manner and in the downstream direction in much the same manner as a milling tool having a Morse taper is removed from a milling machine.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of a sprue and valve assembly with a detached injector nozzle according to the subject invention;

FIG. 5 is a cross-sectional view as in FIG. 4 showing the ejector means coupled to the valve body and forcibly ejecting the cured residual core from the flow passage;

DETAILED DESCRIPTION OF THE PREFERRED EMBODIMENT

Figure 1:
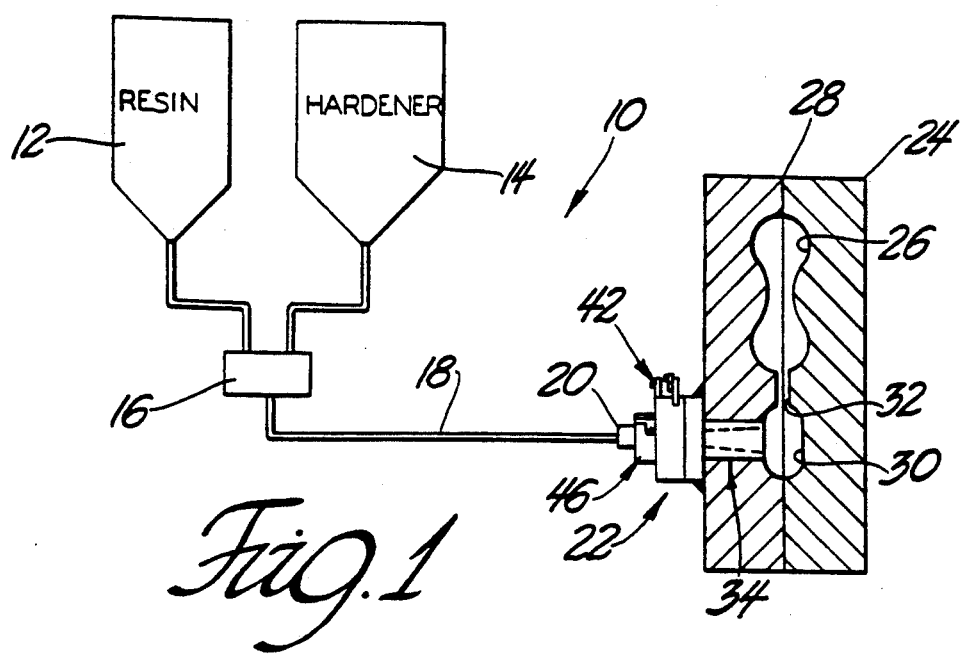
FIG. 1 is a schematic view of a resin transfer molding apparatus.

Referring to the figures, wherein like numerals indicate like or corresponding parts throughout the several views, a resin transfer molding (RTM) apparatus is generally shown at 10 in FIG. 1. The schematically represented apparatus 10 includes a resin supply 12 and a hardener supply 14. The resin and hardener are transferred in liquid form from the respective supplies 12, 14 to a manifold 16 wherein the two liquids are mixed together and immediately transferred via a flexible supply line 18 to an injector nozzle 20. The injector nozzle 20 is connected to a sprue and valve assembly, generally shown at 22, for delivering the now mixed curable liquid material into a mold 24 having a mold cavity 26 formed therein.

The mold 24 is of the usual type having a pair of half members respectively forming opposite sides of the mold cavity 26 and supported together along a parting line 28 formed interstitially therebetween. The mold 24 includes the usual runner 30 for receiving the injected curable liquid material from a sprue and distributing same to a mold cavity 26 via a plurality of gates 32.

The sprue and valve assembly 22 includes a sprue means, generally indicated at 34, defining an elongated flow passage 36 for transferring the mixed resin and hardener in a downstream direction toward the mold cavity 28. The sprue means 34 includes an outer flange member 38 disposed exteriorly of the mold 24 and welded about its periphery thereto. The sprue means 34 also includes a sprue body 40 extending inwardly through the mold 24 and terminating adjacent the runner 30 so that the flow passage 36 opens into the runner 30. The sprue body 40 has a generally cylindrical exterior arranged concentrically with respect to the disc-like outer flange 38.

The sprue and valve assembly 22 also includes a valve means, generally indicated at 42, for selectively preventing flow of the curable liquid material through the flow passage 36 of the sprue means 34. The valve means 42 is secured to the outer flange 38 preferably by threaded fasteners 44, three out of four of which are shown in FIG. 2.

A connector means, generally indicated at 46 in FIG. 2, is provided for releasibly connecting the supply line 18 of the curable liquid material to the sprue means 34 at an upstream location. More particularly, the connector means 46 extends in an upstream direction from the valve means 42 and is presented exterior of the mold 24 for receiving the ejector nozzle 20. According to the preferred embodiment, the connector means 46 includes a bayonet style fitting having a plurality of L-shaped notches 48 disposed radially about the flow passage 36 for receiving corresponding radially extending pins 50 of the injector nozzle 20. The L-shaped notches 48 are formed by three arms which extend integrally from the valve means 42. In typical bayonet fitting style, the injector nozzle 20 is axially received in the connector means 46 with the pins 50 registering within each of the L-shaped notches 48. The injector nozzle 20 is then manually twisted in the clockwise direction to draw the nose of the injector nozzle 20 into tight fitting engagement with the valve means 42, aligned coaxially along the flow passage 36.

Figure 3:
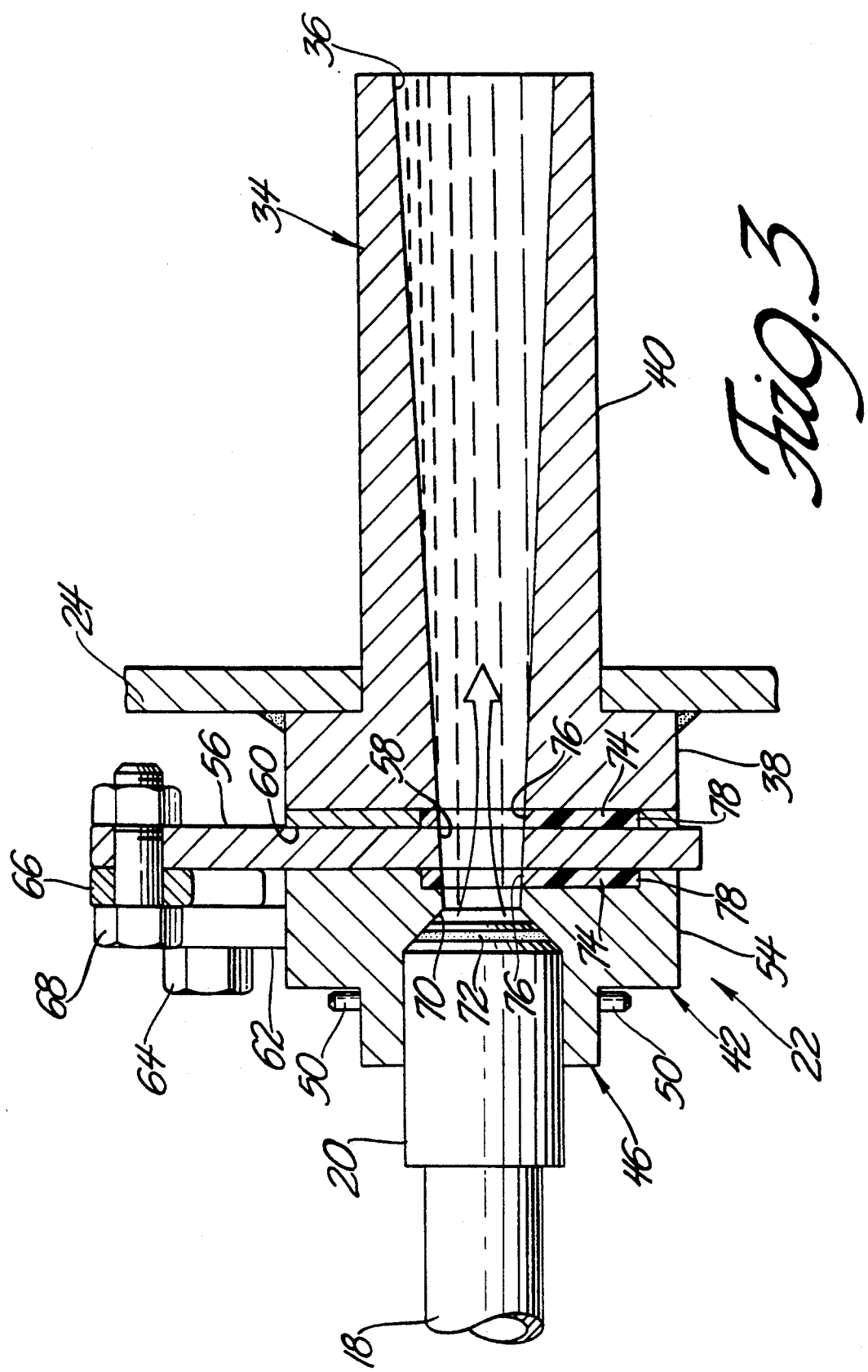
FIG. 3 is a cross-sectional view of the subject sprue and valve assembly showing a connected supply line and injector nozzle.
Figure 4:
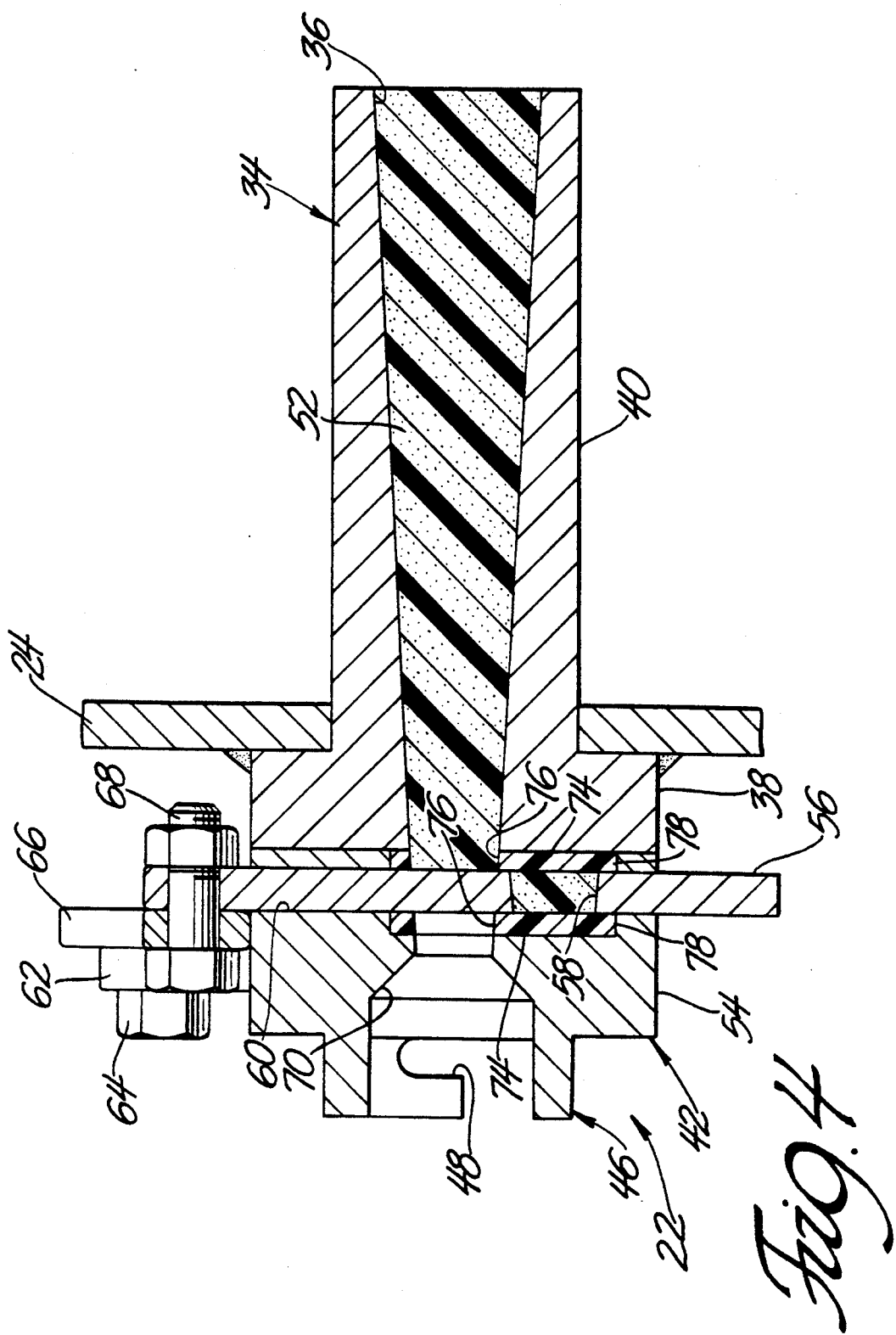
FIG. 4 is a cross-sectional view as in FIG. 3 showing the coin slide type closure element in the closed position and a cured residual core of resin disposed within the flow passage.

Referring now to FIGS. 3-5, the flow passage 36 is shown having a taper enlarging in the downstream direction for effecting convenient removal of a cured residual core 52. That is, once the mold cavity 26 has been filled and the curable resin therein cured, a residual core 52 remains trapped in the flow passage 36 at the end of each cycle. This cured residual core 52 must be removed or cleaned from the flow passage 36 before the apparatus 10 may be cycled to again fill the mold cavity 26 with resin. The taper of the flow passage 36 has a uniformly changing cross-section which, in the preferred embodiment, is frustoconical. Therefore, consistent with the generally recognized geometric relationship of a frustoconical surface area, the flow passage 36 has a circular cross section at all locations taken perpendicular to the downstream direction. The flow passage 36 extends through the valve means 42 with the frustoconical taper continuing in perfectly aligned fashion with the tapering portion of the flow passage 36 within the sprue means 34.

The valve means 42 includes a valve body 54 and a closure element 56 moveable within the valve body 54 to an open position (FIGS. 3 and 5) surrounding the flow passage 36 and to a closed position (FIG. 4) blocking the flow passage 36. In other words, the closure element 56 includes an aperture 58 disposed therein and having a frustoconical shape in registry with the flow passage 36 when the closure element 56 is in the open position. However, when in the closed position, the aperture 58 is moved out of registry with the flow passage 36 such that the body of the closure element 56 blocks or otherwise prevents fluid flow through the flow passage 36.

As shown in the figures, the closure element 56 comprises a coin slide type member disposed in a slideway 60 of the valve body 54 for reciprocally supporting the closure element 56. The slideway 60 carries the coin slide in a reciprocating orientation generally perpendicular to the downstream direction of fluid flow through the flow passage 36.

As best shown in FIG. 2, a lever actuator mechanism is provided for moving the closure element 56 between the open and closed positions. The lever actuator mechanism includes a support member 62 extending upwardly from the valve body 54 and pivotally carrying a fulcrum pivot 64. The fulcrum pivot 64 operatively connects a lever 66 to the support member 62 for pivotal movement therebetween. The lever 66, in turn, is pivotally connected to the closure element 56 by a pivot bolt 68. Because the closure element 56 is limited to straight reciprocating motion and the support member 62 rigidly extends from the valve body 54, a certain amount of play or lost motion must be provided between any one or both of the fulcrum pivot 64 and pivot bolt 68 and their respective connecting members so that the arcuate motion of the actuated end of the lever 66 translates linear motion to the closure element 56. In an alternative embodiment, not shown, the closure element 56 can be actuated by a solenoid type actuator or some other remotely operable actuator instead of the lever actuator mechanism so that the RTM process can be automated.

Referring again to FIGS. 3-5, the flow passage 36 is shown extending partway through the valve body 54 whereupon the flow passage 36 terminates at a frustoconical seat 70 disposed between the closure element 56 and the connector means 46. The seat 70 is adapted to receive the frustoconical nose end portion of the ejector nozzle 20 in tight-fitting engagement. An 0-ring seal 72 is carried by the frustoconical nose end of the injector nozzle 20 for perfecting a fluid tight and pressure resistant seal.

The valve means 42 includes at least one, and preferably two, seals 74 disposed between the closure element 56 and the valve body 54 and surrounding the flow passage 36. The two seals 74 are disposed one each on opposite sides of the closure element 56 in the orientation illustrated in the figures wherein the upstreammost seal 74 is sandwiched between the valve body 54 and the closure element 56, and the downstreammost seal 74 is sandwiched between the closure element 56 and the outer flange 38 of the sprue means 34. In other words, the seals 74 form a portion of the slideway 60 within the valve body 54. As with the closure element 56, the seals 74 each include conically tapering openings 76 in precise alignment with the frustoconicially tapering flow passage 36. Preferably, the seals 74 consist essentially of a polytetrafluoroethylene (PTFE) material.

Figure 6:
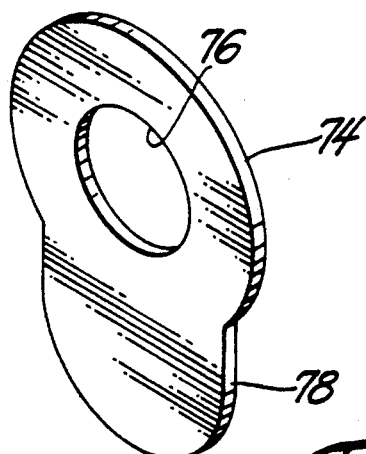
FIG. 6 is a perspective view of one of the polytetrafluoroethylene seals.

As shown in FIG. 6, each of the seals 74 are of a sheet-like construction having a generally annular periphery about the respective openings 76 and a tongue portion 78 extending radially therefrom to form a somewhat key hole-shaped outline. The tongue portions 78 are arranged within the valve body 54 so that as the closure element 56 is moved toward the closed position, the aperture 58 becomes entrapped between the opposing tongue portions 78 of the two seals 74, as shown in FIG. 4. In this manner, the sticky liquid resin material contained within the aperture 58 of the closure element 56 as the closure element 56 is moved toward the closed position is maintained in contact with the high lubricity PTFE seals 74.

Figure 7:
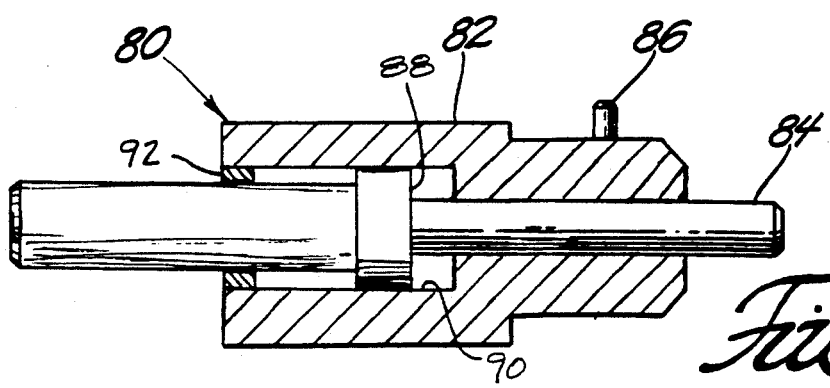
FIG. 7 is a cross-sectional view of the ejector means.

An ejector means, generally indicated at 80 in FIGS. 5 and 7, is provided for forcefully ejecting the cured residual core 52 from the flow passage 36. The ejector means 80 is shown in operation in FIG. 5 including a guide body 82 slideably supporting an ejector shaft 84. When the ejector shaft 84 is struck in the direction of the arrow shown in FIG. 5, such as with a hammer, the cured residual core 52 is dislodged from the flow passage 36 in the downstream direction, in much the same manner as a Morse taper milling tool is removed from the chuck of a milling machine.

The ejector means 80 includes a pin 86 extending radially from the guide body 82 and operatively engagable with the bayonet style fitting of the connector means 46. Thus, the pin 86 of the ejector means 80 is received into one of the L-shaped notches 48 to securely hold the guide body 82 in place with the ejector shaft 84 aligned along the axis of the flow passage 36. The guide body 82 may be knurled to facilitate handling.

The ejector means 80 is shown in cross-section in FIG. 7 including an integral stop member 88 disposed on the ejector shaft 84 and abutable against the inside of the guide body 82. A cylindrical cavity 90 is formed in the guide body 82 for receiving the stop member 88, with a bushing 92 being force fit or otherwise retained as a closure over the end of the cavity 90 and slideably supporting the ejector shaft 84.

In operation, the RTM apparatus 10 is activated to cause resin and hardener liquid materials to flow from the respective supplies 12, 14 into the mixing manifold 16 where the two liquid components become stirred together to form a curable liquid material. From the mixing manifold 16, the curable liquid material is transferred via the supply line 18 to the injector nozzle 20 which, at this time, is connected by the bayonet fitting to the valve body 54. The closure element 56 is in the open position at this time to allow the curable liquid material flowing through the injector nozzle 20 to pass into the flow passage 36 and into the runner 30, and ultimately to the mold cavity 26.

Once the mold cavity 26 has been completely filled, the closure element 56 is moved to the closed position wherein the aperture 58 is moved out of registry with the flow passage 36. At this point, the curable liquid material is prevented from moving in an upstream direction out of the mold cavity 26 while the mold 24 is heated. The injector nozzle 20 is then removed from the sprue and valve assembly 22, and the entire mold assembly 24 and attached sprue and valve assembly 22 heated to a curing temperature for a limited time period.

As the resin mixture cures, it shrinks and solidifies, and under normal circumstances automatically dislodges itself from the flow passage 36 due to the taper enlarging in the downstream direction. Under these normal circumstances, once the curing operation is complete, the mold 24 is separated at the parting line 28 and the molded article removed from the mold cavity 26. with the cured residual core 52 being removed while still attached to the runner core in simple fashion.

However, in those instances where the cured residual core 52 steadfastly adheres within the flow passage 36 and will not automatically dislodge itself from the sprue and valve assembly 22, the ejector means 80 is connected to the valve body 54 and, as shown in FIG. 5 with the closure element 56 in the open position, the ejector shaft 84 is struck in the direction of the arrow to force the cured residual core 52 from the flow passage 36. The cured residual core 52 is then easily removed rearwardly from the sprue and valve assembly 22 with the mold 24 still open.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A sprue and valve assembly (22) for delivering a curable liquid material to a mold cavity (26) and thereafter easily cleaned of a cured residual core (52) remaining from the liquid material, said assembly (22) comprising: sprue means (34) defining an elongated flow passage (36) for transferring the curable liquid material in a downstream direction toward a mold cavity (26); connector means (46) for releasably connecting a supply line (18) of the liquid material to said sprue means (34) at an upstream location; valve means (42) surrounding said flow passage (36) and disposed downstream of said connector means (46) for selectively preventing flow of the liquid material through said flow passage (36), said valve means (42) including a valve body (54) and a closure element (56) moveable within said valve body (54) to an open position surrounding said flow passage (36) and to a closed position blocking said flow passage (36); and said flow passage (36) having a taper enlarging in the downstream direction for effecting convenient removal of the cured residual core (52), said taper of said flow passage (46) having a uniformly changing cross section; and ejector means (80) for forcefully ejecting the cured residual core (52) through said flow passage (36) and through said closure element (56) in a downstream direction away form said connector means (46).

2. An assembly as set forth in claim 1 wherein said connector means (46) includes a bayonet fitting.

3. An assembly as set forth in claim 2 wherein said valve means (42) includes at least one seal (74) disposed between said closure element (56) and said valve body (54) and surrounding said flow passage (36).

4. An assembly as set forth in claim 3 wherein aid valve body (54) includes a slideway (60) for reciprocally supporting said closure element (56).

5. An assembly as set forth in claim 4 wherein said closure element (56) comprises a coin slide.

6. An assembly as set forth in claim 5 wherein said valve means (42) includes a pair of said seals (74) disposed one each on opposite sides of said closure element (56).

7. An assembly as set forth in claim 6 wherein said seals (74) consist essentially of polytetrafluoroethylene.

8. An assembly as set forth in claim 5 wherein each of said seals (74) is generally annular and has a tongue portion (78) extending radially therefrom.

9. An assembly as set forth in claim 5 wherein said valve means (42) includes a lever actuator mechanism for moving said closure element (56) between said open and closed positions.

10. An assembly as set forth in claim 1 wherein said ejector means (80) includes a guide body (82) slideably supporting an ejector shaft (84).

11. An assembly as set forth in claim 10 wherein said ejector means (80) includes a stop member (88) disposed on said ejector shaft (84) and abuttable against said guide body (82).

12. An assembly as set forth in claim 17 wherein said connector means (46) includes a bayonet fitting.

13. An assembly as set forth in claim 12 wherein said ejector means (80) includes a radially extending pin (86) operatively enageable with said bayonet fitting.

14. A sprue and valve assembly (22) for delivering a curable liquid material to a mold cavity (26) and thereafter easily cleaned of a cured residual core (52) remaining from the liquid material, said assembly (22) comprising: a sprue body (40); an outer flange (38) extending from said sprue body (40); a valve body (54) fixedly attached to said outer flange (38); connector means (46) extending from said valve body (54) for releasably connecting a supply line (18) of the liquid material to said valve body (54) at an upstream location; a slideway (60) formed in said valve body (54); a closure element (56) slideably supported in said slideway (60); a pair of seals (74) disposed one each on opposite sides of said closure element (56); and a tapered flow passage (36) extending through said sprue body (40), said outer flange (38), said valve body (54), said closure element (56), and said pair of seals (74) and having a frustoconical shape enlarging in the downstream direction for affecting convenient removal of the cured residual core (52); and ejector means (80) engageable with said connector means (46) for forcefully ejecting the cured residual core (52) through said flow passage (36) and through said closure element (56) in the downstream direction away from said connector means (46).

* * * * *